United States Patent [19]

Suzuki

[11] Patent Number: 5,276,663
[45] Date of Patent: Jan. 4, 1994

[54] OPTICAL INFORMATION RECORDING-REPRODUCING APPARATUS INCLUDING A CONDENSING LENS SECURED TO A LENS BARREL

[75] Inventor: Yoshio Suzuki, Tokyo, Japan

[73] Assignee: Canon Kabushiki Kaisha, Tokyo, Japan

[21] Appl. No.: 29,955

[22] Filed: Mar. 9, 1993

Related U.S. Application Data

[63] Continuation of Ser. No. 509,139, Apr. 16, 1990, abandoned.

[30] Foreign Application Priority Data

Apr. 17, 1989 [JP] Japan .................. 1-095230

[51] Int. Cl.$^5$ .............................................. G11B 7/00
[52] U.S. Cl. ............................... 369/44.23; 369/118; 369/112; 359/819
[58] Field of Search ................. 369/44.15, 44.23, 112, 369/118, 44.24, 122, 110, 44.22; 359/808, 809, 811, 819, 829, 830

[56] References Cited

U.S. PATENT DOCUMENTS

| | | | |
|---|---|---|---|
| 4,406,520 | 9/1983 | Sato | 350/173 |
| 4,672,594 | 6/1987 | Kato et al. | 369/13 |
| 4,725,721 | 2/1988 | Nakamuza et al. | 369/44.24 |
| 4,785,438 | 11/1988 | Mizunoe | 369/110 |
| 5,001,695 | 3/1991 | Tominaga | 369/44.35 |
| 5,049,428 | 9/1991 | Kanno et al. | 369/283 |

FOREIGN PATENT DOCUMENTS

0109194  5/1984  European Pat. Off. .
0226403  6/1987  European Pat. Off. .

*Primary Examiner*—Aristotelis Psitos
*Assistant Examiner*—Nabil Hindi
*Attorney, Agent, or Firm*—Fitzpatrick, Cella, Harper & Scinto

[57] ABSTRACT

An optical information recording-reproducing apparatus includes a light source unit producing a light beam applied to an optical information recording medium, a first optical device disposed in an optical path leading from the light source unit to the optical information recording medium for directing the light beam from the light source unit to the optical information recording medium and separating the light beam passed through the optical information recording medium from the light beam from the light source unit, a second optical device for condensing the light beam passed through the optical information recording medium and separated by the first optical device, the second optical device including a first condensing lens, a holding member for holding the first condensing lens, and a second condensing lens mounted on the holding member, a first light receiving member for receiving the light beam condensed by the second optical device to obtain the focus control signal and/or a tracking control signal of the light beam directed to the optical information recording medium through the first optical device, and a second light receiving member for receiving the light beam condensed by the second optical device to obtain a reproduced signal of information recorded on the optical information recording medium.

9 Claims, 5 Drawing Sheets

OPTICAL INFORMATION RECORDING-REPRODUCING APPARATUS INCLUDING A CONDENSING LENS SECURED TO A LENS BARREL

This application is a continuation of prior application, Ser. No. 07/509,139 filed Apr. 16, 1990, now abandoned.

BACKGROUND AND SUMMARY OF THE INVENTION

This invention relates to an optical head provided in the head unit of an optical information recording-reproducing apparatus such as a magneto-optical disk apparatus.

Along with the present day development of optoelectronics, there have been manufactured optical information recording-reproducing apparatus capable of recording and/or reproducing and/or erasing audio or image formation at a high performance and at random by the use of a light beam.

For example, in an optical video apparatus, recorded information comprising a projection (pit) pattern on a disk surface formed of transparent acrylic resin, transparent polycarbonate or the like is detected by an optical head and is photoelectrically converted, whereafter it is properly gain-adjusted by an amplifier and is further converted into a predetermined analog amount through a reproducing circuit such as a D-A converter, whereafter it is output by the use of an output device.

Originally, an optical head displays its function as an optical head only by having various optical parts being mounted therein. As shown, for example, in FIG. 1 of the accompanying drawings, a semiconductor laser 1 and a collimator lens (mounted in a collimator lens barrel 2) are adjusted, or as also shown in FIG. 1, polarizing beam splitters (PBS's) 3, 6, 7, an objective lens (mounted in an objective lens barrel 4), a condensing lens barrel 5, a servo sensor 8 for obtaining the focus control signal and/or the tracking control signal of a light beam directed to a recording medium, and an RF sensor (a magneto-optical signal detecting sensor) 9 for obtaining the reproduced signal of information recorded on the recording medium are mounted in the head body.

Figure 1:
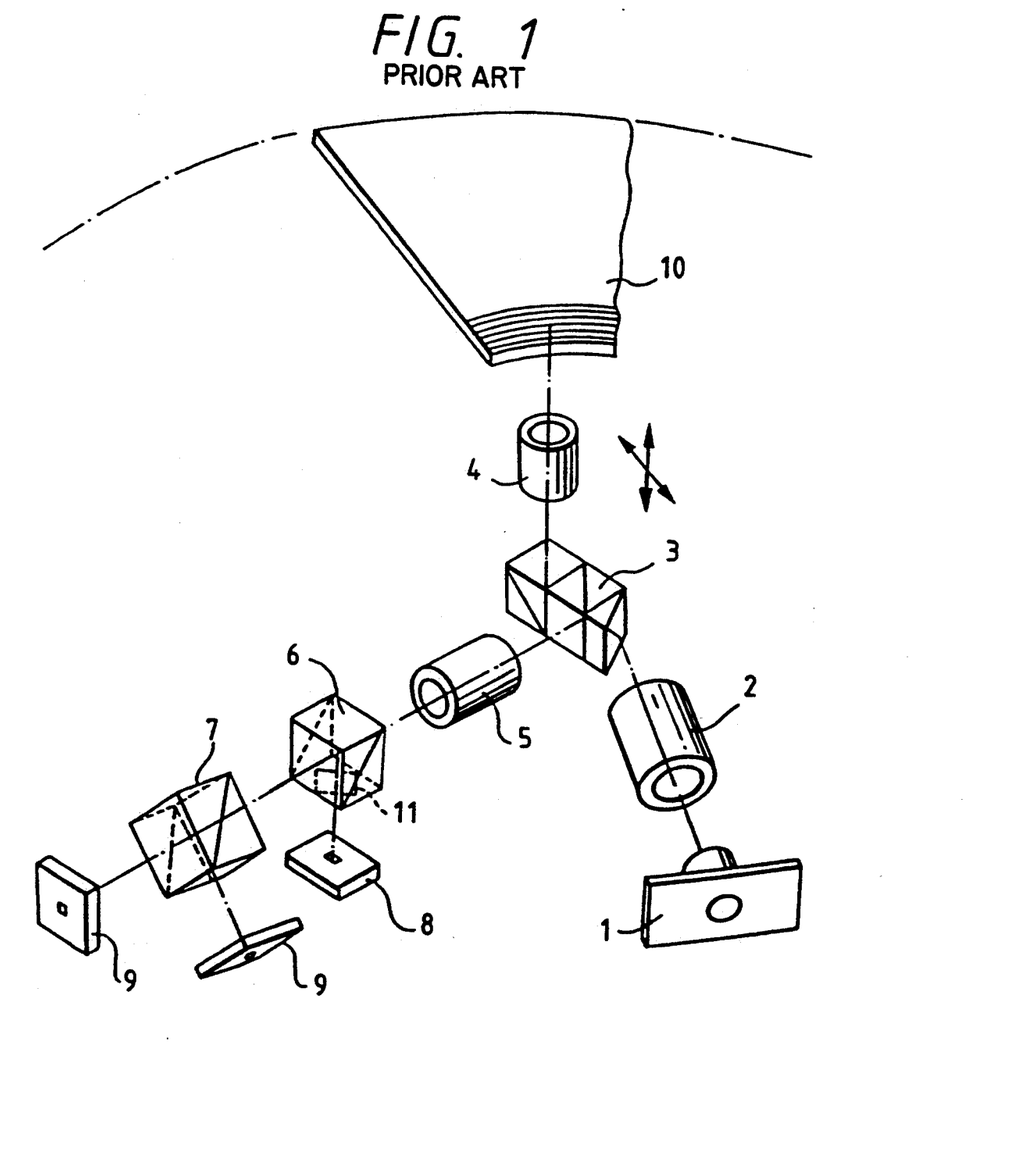
FIG. 1 shows the arrangement of optical parts in an example of the optical head according to the prior art.

FIG. 1 is a perspective view showing the arrangement of optical parts in an optical head according to the prior art.

Here, a beam condensed by the condensing lens 5 passes through the polarizing beam splitter 6 and further passes through a toric lens 11 adhesively secured to the polarizing beam splitter 6 and reaches the servo sensor 8. To narrow the pull-in range of the focus and increase the sensitivity of the focus when a focus error signal is obtained by the servo sensor, it is necessary to make the focal length (back focal length) of the condensing lens 5 great and also necessary to bring the radii of the meridional line and latitudinal line of the toric lens 11 close to each other. However, to provide a compact and light-weight optical head, it is necessary to shorten the distance from the condensing lens 5 to the servo sensor 8 and therefore, there has been a construction as shown, for example, in FIG. 1 wherein the toric lens 11 is adhesively secured to the polarizing beam splitter 6.

Figure 2:
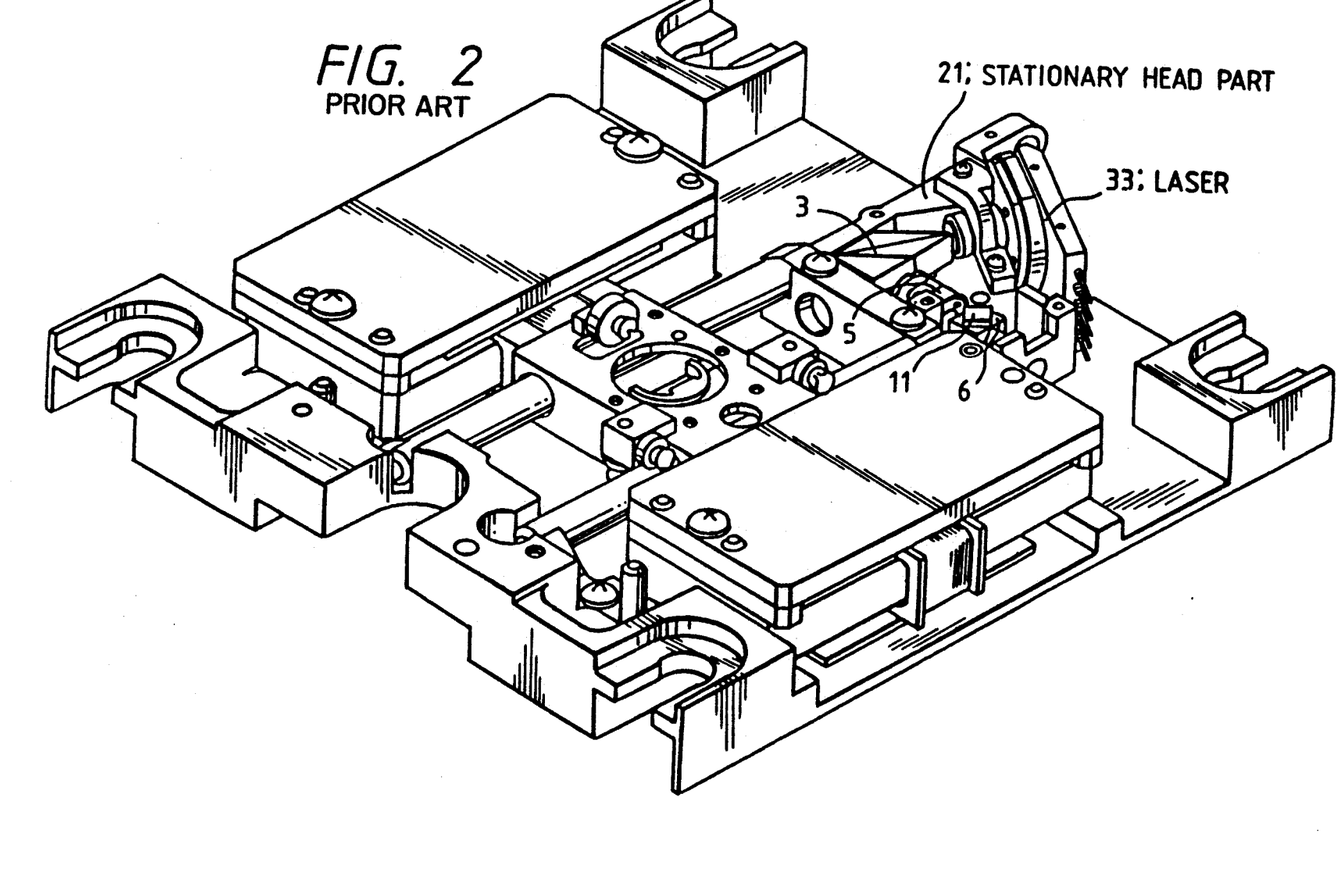
FIG. 2 shows the arrangement of optical parts in a separating optical system according to the prior art.

However, in the so-called separation optical type as shown in FIG. 2 of the accompanying drawings which has a fixed head portion 21 in which a laser 33, etc. are fixed to the apparatus body, if instead of adopting an arrangement similar to the so-called unitary type in which a laser, an objective lens, etc. are made into a unitary construction, an attempt is made to narrow the pull-in range of the focus and thereby increase the focus sensitivity, the distance from the condensing lens 5 to the servo sensor 8 will become long. Particularly, the distance from the toric lens 11 to the servo sensor 8 will also become long, and this will pose a serious problem when making the drive device compact from a full height size to a half height size.

Further, the adjustment of the toric lens 11 to the optic axis is effected through the polarizing beam splitter 6 and therefore, the error is increased, and in the combined use type wherein the sensor 8 obtains a focus error signal and a tracking error signal, this has led to a problem that the leak from the tracking error signal into the focus error signal, i.e., the so-called cross talk amount, becomes great.

The present invention has been made in view of the above-noted problems and an object thereof is to provide an optical head in which it is possible to increase the accuracy of adjustment of a condensing lens barrel and a toric lens on the optic axis and reduce the cross talk amount and to make a drive device compact.

The above object is achieved by the following optical information recording-reproducing apparatus of the present invention.

The optical information recording-reproducing apparatus of the present invention comprises:

a light source unit producing a light beam applied to an optical information recording medium;

first optical means disposed in an optical path leading from said light source unit to the optical information recording medium for directing the light beam from said light source unit to the optical information recording medium and separating the light beam passed through said optical information recording medium from the light beam from said light source unit;

second optical means for condensing the light beam passed through said optical information recording medium and separated by said first optical means, said second optical means comprising a first condensing lens, a holding member for holding said first condensing lens, and a second condensing lens mounted on said holding member;

a first light receiving member for receiving the light beam condensed by said second optical means to obtain the focus control signal and/or the tracking control signal of the light beam directed to the optical information recording medium through said first optical means; and a second light receiving member for receiving the light beam condensed by said second optical means to obtain the reproduced signal of information recorded on said optical information recording medium.

More particularly, the apparatus of the present invention is characterized in that a toric lens or a cylindrical lens is joined to a condensing lens barrel provided on the optical path of the light beam after being passed through the optical information recording medium, at the emerging position of the light beam passed through said lens barrel.

DESCRIPTION OF THE PREFERRED EMBODIMENTS

An embodiment of the present invention will hereinafter be described specifically in detail with reference to the drawings.

Figure 3:
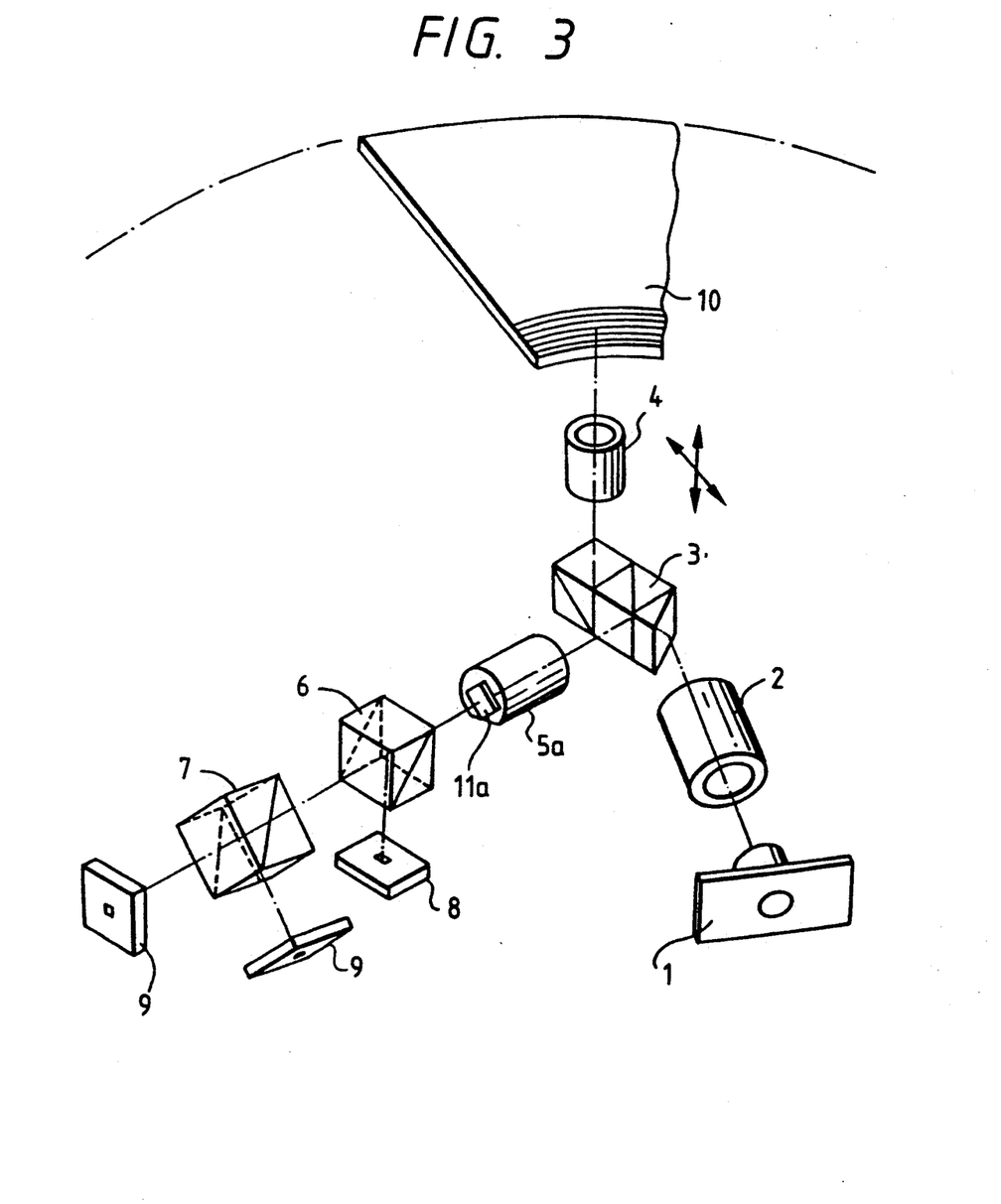
FIG. 3 shows the arrangement of optical parts in an embodiment of an optical head used in an optical information recording-reproducing apparatus according to the present invention.

FIG. 3 shows the arrangement of optical parts in an embodiment of an optical head used in an optical information recording-reproducing apparatus according to the present invention.

In FIG. 3, members identical to those in FIG. 1 are given common reference numerals and need not be described.

As shown in FIG. 3, in the present invention, a toric lens 11a is adhesively secured to a condensing lens barrel 5a. In the present embodiment, the toric lens 11a is mounted on the emergence side of the condensing lens barrel 5a in the direction of travel of a light beam reflected by disk 10 which is an optical information recording medium. Thus, the toric lens is joined to a holding member for holding the condensing lens.

Figure 4:
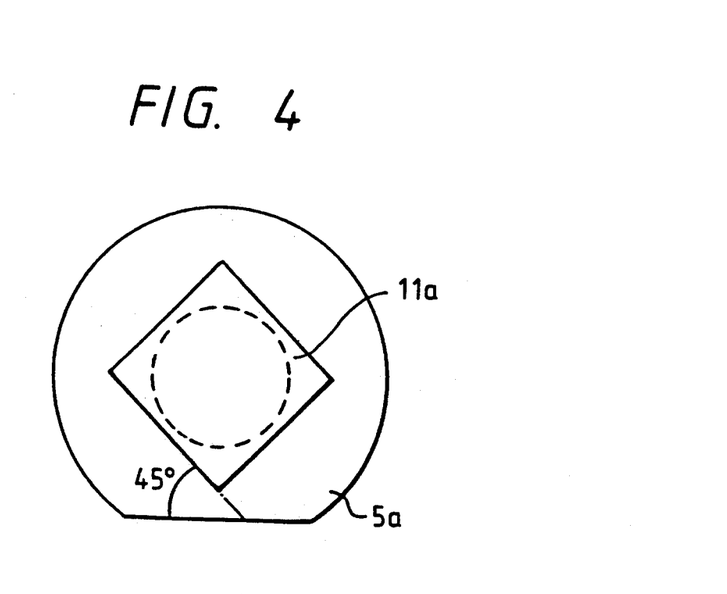
FIG. 4 is a front view of a condensing lens barrel and a toric lens.

Various methods of adjusting the mounted position of the toric lens and various methods of adhesively securing the toric lens are conceivable, but for example, as shown in FIG. 4, the center of the condensing lens barrel 5a and the center of the toric lens 11a (or a cylindrical lens) may be made coincident with each other and further, the toric lens may be adhesively secured with the angle of the - end edge portion of the toric lens 11a (or a cylindrical lens) with respect to the D-cut surface of the condensing lens barrel 5a being adjusted suitably (in the present embodiment, to 45°). Thus, the condensing lens and the toric lens are made integral with each other by the condensing lens barrel.

If the toric lens 11a is thus adhesively secured to the condensing lens barrel 5a, the focal length (the back focal length) of the condensing lens can be made long, and even in an optical system wherein radiuses of the meridional line and latitudinal line of the toric lens are brought close to each other to thereby increase the focus sensitivity, it is possible to shorten the distance from a polarizing beam splitter 6 for separating a light beam for RF and a light beam for servo from each other to a servo sensor 8 for obtaining the focus control signal and/or the tracking control signal of a light beam directed to the recording medium. Accordingly, compactness of the optical head can be achieved. This also results in better assembling work efficiency than in a case wherein the toric lens is directly joined to the condensing lens.

Further, the accuracy of adjustment to the optic axis is more improved than in the example shown in FIG. 1 wherein the toric lens 11 is adhesively secured to the polarizing beam splitter 6 and therefore, in the combined use type wherein the sensor 8 obtains a focus error signal and a tracking error signal, the leakage of a tracking signal into a focusing signal, i.e., the so-called cross talk amount, is reduced and the reliability of AF (auto focusing) and AT (auto tracking) control is improved.

While in the present embodiment, description has been made of the toric lens 11a, a similar effect is also obtained when a cylindrical lens, instead of the toric lens, is employed. Description has also been made of a head for a magneto-optical recording-reproducing apparatus, but a similar effect is obtained with respect to a system such as an optical disk in which focus control by astigmatism is effected in a continuous servo.

Figure 5:
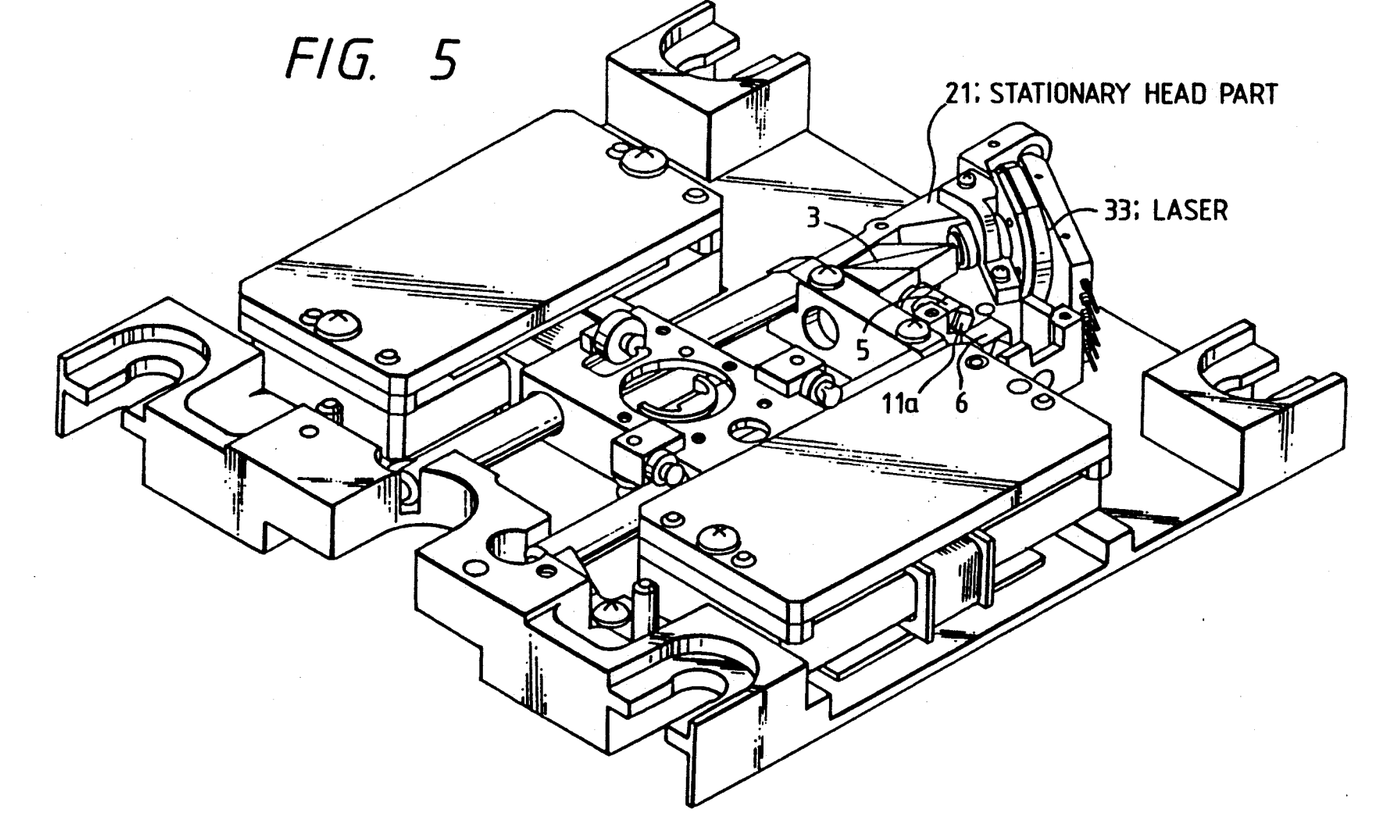
FIG. 5 is a perspective view showing an embodiment of the separating optical system of the present invention.

FIG. 5 shows an optical information recording-reproducing apparatus using a separating optical system which is another embodiment of the present invention. In this system, the distance from the polarizing beam splitter 6 to a servo sensor (not shown) is short and therefore, compactness with respect to the direction of height of the drive device can be achieved.

Thus, in the optical information recording-reproducing apparatus of the present invention, the toric lens or the cylindrical lens is joined to the condensing lens barrel provided on the optical path of the light beam after being passed through the optical information recording medium, at the emerging position of the light beam passed through said lens barrel.

If such a construction is adopted, particularly when the light beam passed through this condensing lens barrel is received by a so-called AF-AT type sensor for obtaining AF (auto-focusing) and AT (auto-tracking) control signals, the accuracy of adjustment of a lens having an amorphic power differing in power between two directions orthogonal to each other, such as a toric lens or a cylindrical lens, with respect to the optic axis of the condensing lens in the condensing lens barrel is good and therefore, the leakage of the tracking signal into the focusing signal, i.e., the so-called cross talk amount, is reduced.

As described above, the optical information recording-reproducing apparatus of the present invention comprises:

a light source unit producing a light beam applied to an optical information recording medium;

first optical means disposed in an optical path leading from said light source unit to the optical information recording medium for directing the light beam from said light source unit to the optical information recording medium and separating the light beam passed through said optical information recording medium from the light beam from said light source unit;

second optical means for condensing the light beam passed through said optical information recording medium and separated by said first optical means, said second optical means comprising a first condensing lens, a holding member for holding said first condensing lens, and a second condensing lens mounted on said holding member, a first light receiving member for receiving the light beam condensed by said second optical means to obtain the focus control signal and/or the tracking control signal of the light beam directed to the optical information recording medium through said first optical means; and a second light receiving member for receiving the light beam condensed by said second optical means to obtain the reproduced signal of information recorded on said optical information recording medium.

Said second condensing lens is a toric lens or a cylindrical lens.

Also, said second condensing lens is adhesively mounted on said holding member.

Also, the optical information recording-reproducing apparatus of the present invention comprises:

a light source unit producing a light beam applied to an optical information recording medium;

first optical means disposed in an optical path leading from said light source unit to the optical information recording medium for directing the light beam from said light source unit to said optical information recording medium to effect recording and/or reproduction of information on said optical information recording medium;

second optical means for condensing the light beam directed to said optical information recording medium by said first optical means and passed through said optical information recording medium, said second optical means comprising a first condensing lens, a holding member for holding said first condensing lens, and a second condensing lens mounted on said holding member; and a light receiving member for receiving the light beam condensed by said second optical means to obtain a predetermined signal from the light beam passed through said optical information recording medium.

Also, the optical information recording-reproducing apparatus of the present invention comprises:

a light source unit producing a light beam applied to an optical information recording medium;

first optical means disposed in an optical path leading from said light source unit to the optical information recording medium for directing the light beam from said light source unit to the optical information recording medium;

second optical means for condensing the light beam directed to said optical information recording medium by said first optical means and passed through said optical information recording medium, said second optical means comprising a first condensing lens, a holding member for holding said first condensing lens, and a second condensing lens mounted on said holding member;

third optical means for separating the light beam condensed by said second optical means into a first direction and a second direction differing from said first direction;

a first light receiving member for receiving the light beam separated into said first direction by said third optical means to obtain the focus control signal and/or the tracking control signal of the light beam directed to the optical information recording medium through said first optical means; and a second light receiving member for receiving the light beam separated into said second direction by said third optical means to obtain the reproduced signal of information recorded on said optical information recording medium.

As described in detail above, a toric lens or a cylindrical lens is adhesively secured to a condensing lens barrel comprising a condensing lens for condensing a light beam directed to an optical information recording medium and passed through the medium and a holding member for holding the condensing lens, whereby the compactness of an optical head used in an optical information recording-reproducing apparatus and a reduction in the cross talk amount can be achieved.

What is claimed is:

1. An optical information recording-reproducing apparatus comprising:

a light source unit for producing a light beam applied to an optical information recording medium;

first optical means disposed in an optical path leading from said light source unit to the optical information recording medium for directing the light beam from said light source unit to the optical information recording medium and for separating the light beam having been applied to the optical information recording medium from the light beam from said light source unit;

second optical means for condensing the light beam having been applied to the optical information recording medium and separated by said first optical means, said second optical means comprising (i) a first condensing lens, (ii) a lens barrel for holding said first condensing lens, said lens barrel comprising a D-cut surface and (iii) a second condensing lens adhesively secured to the D-cut surface of said lens barrel;

a first light receiving member for receiving the light beam condensed by said second optical means to obtain at least one of a focus control signal and a tracking control signal of the light beam directed to the optical information recording medium through said first optical means; and a second light receiving member for receiving the light beam condensed by said second optical means to obtain a reproduced signal of information recorded on the optical information recording medium.

2. An optical information recording-reproducing apparatus according to claim 1, wherein said second condensing lens comprises one of a toric lens and a cylindrical lens.

3. An optical information recording-reproducing apparatus according to claim 1, wherein an edge portion of said second condensing lens is arranged at substantially 45° with respect to the D-cut surface of said lens barrel.

4. An optical information recording-reproducing apparatus comprising:

a light source unit for producing a light beam applied to an optical information recording medium;

first optical means disposed in an optical path leading from said light source unit to the optical information recording medium for directing the light beam from said light source unit to the optical information recording medium to effect at least one of recording of information on and reproducing of information from the optical information recording medium;

second optical means for condensing the light beam directed to the optical information recording medium by said first optical means and having been applied to the optical information recording medium, said second optical means comprising (i) a first condensing lens, (ii) a lens barrel for holding said first condensing lens, said lens barrel comprising a D-cut surface and (iii) a second condensing lens adhesively secured to the D-cut surface of said lens barrel; and a light receiving member for receiving the light beam condensed by said second optical means to obtain a predetermined signal from the light beam having been applied to the optical information recording medium.

5. An optical information recording-reproducing apparatus according to claim 4, wherein said second condensing lens comprises one of a toric lens and a cylindrical lens.

6. An optical information recording-reproducing apparatus according to claim 4, wherein an end edge portion of said second condensing lens is arranged at substantially 45° with respect to the D-cut surface of said lens barrel.

7. An optical information recording-reproducing apparatus comprising:

a light source unit for producing a light beam applied to an optical information recording medium;

first optical means disposed in an optical path leading from said light source unit to the optical information recording medium for directing the light beam from said light source unit to the optical information recording medium;

second optical means for condensing the light beam directed to the optical information recording medium by said first optical means and having been applied to the optical information recording medium, said second optical means comprising (i) a first condensing lens, (ii) a lens barrel for holding said first condensing lens, said lens barrel comprising a D-cut surface and (iii) a second condensing lens adhesively secured to said lens barrel;

third optical means for separating the light beam condensed by said second optical means into a first direction and a second direction differing from the first direction;

a first light receiving member for receiving the light beam separated into the first direction by said third optical means to obtain at least one of a focus control signal and a tracking control signal of the light beam directed to the optical information recording medium through said first optical means; and a second light receiving member for receiving the light beam separated into the second direction by said third optical means to obtain a reproduced signal of information recorded on the optical information recording medium.

8. An optical information recording-reproducing apparatus according to claim 7, wherein said second condensing lens comprises one of a toric lens and a cylindrical lens.

9. An optical information recording-reproducing apparatus according to claim 7, wherein an end edge portion of said second condensing lens is arranged at substantially 45° with respect to the D-cut surface of said lens barrel.

* * * * *

UNITED STATES PATENT AND TRADEMARK OFFICE
CERTIFICATE OF CORRECTION

PATENT NO. : 5,276,663
DATED : January 4, 1994
INVENTOR(S) : YASUO SUZUKI

It is certified that error appears in the above-indentified patent and that said Letters Patent is hereby corrected as shown below:

ON THE TITLE PAGE

IN ITEM "[75] INVENTOR":

"Yoshio Suzuki," should read --Yasuo Suzuki,--.

IN THE ABSTRACT:

Line 18, "the" (second occurrence) should read --a--.

COLUMN 3:

Line 40, "the - end" should read --the end--.

COLUMN 4:

Line 56, "member," should read --member;--.

Signed and Sealed this

Twenty-first Day of June, 1994

BRUCE LEHMAN

*Attest:*

*Attesting Officer*    Commissioner of Patents and Trademarks